United States Patent [19]
Ellner et al.
[11] Patent Number: 4,700,101
[45] Date of Patent: Oct. 13, 1987

[54] ELONGATED TUBULAR LAMP CONSTRUCTION

[76] Inventors: Sidney Ellner; Christian Sauska, both of R.F.D. #2, Bedford, N.Y. 10506

[21] Appl. No.: 699,008

[22] Filed: Feb. 7, 1985

[51] Int. Cl.[4] ........................ H01J 5/46; G01N 21/51

[52] U.S. Cl. ........................................ 313/1; 313/493; 250/436

[58] Field of Search ........................ 313/1, 3, 493, 112, 313/634; 362/230, 219, 224, 225; 210/748; 422/24; 250/436

[56] References Cited

U.S. PATENT DOCUMENTS

| | | | |
|---|---|---|---|
| 1,140,819 | 5/1915 | Henri et al. | 250/436 |
| 2,719,932 | 10/1955 | Stanworth | 313/112 |
| 3,753,036 | 8/1973 | Roche | 313/493 X |
| 3,923,663 | 12/1975 | Reid | 313/312 X |
| 4,020,335 | 4/1977 | Bisceglia | 362/224 |
| 4,285,032 | 8/1981 | Honda et al. | 362/224 |
| 4,296,328 | 10/1981 | Regan | 250/436 |
| 4,320,324 | 3/1982 | Ariga et al. | 313/318 X |
| 4,449,071 | 5/1984 | Yokoyama | 313/493 X |

FOREIGN PATENT DOCUMENTS

| | | | |
|---|---|---|---|
| 54-132374 | 10/1979 | Japan | 313/1 |
| 54-132375 | 10/1979 | Japan | 313/1 |

*Primary Examiner*—David K. Moore
*Assistant Examiner*—Sandra L. O'Shea
*Attorney, Agent, or Firm*—Arthur T. Fattibene

[57] ABSTRACT

A tubular gaseous discharge lamp such as an ultraviolet or fluorescent lamp is provided which includes a hollow cylinder which is connected to a pair of end caps on each of which there is mounted an electrode. The first electrode is connected to an insulated or Teflon coated wire which is disposed along the outside surface of the cylinder and passes through the end cap which supports the second electrode. The second electrode is connected to a second insulated or Teflon coated wire which projects from the second end cap. The wires facilitate connection of the ultraviolet lamp to a source of electrical power which is located at one end of the lamp.

In an alternative embodiment of the invention two or more ultraviolet lamps are inserted into a hollow quartz tube, thereby providing an ultraviolet light source of extended length, or two or more fluorescent lamps may be used in single end application.

4 Claims, 8 Drawing Figures

ELONGATED TUBULAR LAMP CONSTRUCTION

BACKGROUND OF THE INVENTION

The prior art related to water purification systems includes systems in which wastewater is introduced into a contact chamber in which an ultraviolet lamp has been placed. In the past, the path length along which the wastewater can flow was limited to the length of the ultraviolet lamp. For example, if the ultraviolet lamp was 30 inches long, then the length of the contact chamber was approximately 30 inches long. In an effort to overcome this size limitation which limits the amount of ultraviolet energy which is available for water purification purposes, attempts have been made to design contact chambers in which the water flow is perpendicular to a plurality of ultraviolet lamps. These designs have not been successful because water flow at high linear velocities, due to high flow rates, impinging perpendicularly on the quartz jackets, which surround and protect the ultraviolet lamps, results in a severe strain on these quartz jackets. This limits the maximum flow attainable through the contact chamber and limits the water purification capability of the apparatus.

The maximum length of a conventional ultraviolet lamp is a function of a series of complex design factors which limit the maximum length. These factors include: the design of the electrodes, the electrical energy available and the mechanical strength of the cylinder which supports the electrodes. These and other design factors limit the maximum length of a conventional ultraviolet lamp.

It is an object of the present invention to provide an ultraviolet light source having an extended length which is substantially longer than the length of an individual ultraviolet lamp.

Another object of the present invention is to provide an ultraviolet lamp which requires electrical connection only at one end.

Another object of the present invention is to provide an ultraviolet lamp which can be inserted into a quartz tube which is sealed at one end.

Another object of the present invention is to provide an ultraviolet light source, the length of which is not limited by the length of an individual ultraviolet lamp.

Another object of the present invention is to provide an ultraviolet lamp which can be used effectively in a water treatment contact chamber in which the flow of water is parallel to the lamp.

Another object of the present invention is to provide an ultraviolet light source which is extremely rugged and reliable permitting its uses in applications which require high wastewater flow rates.

Still another object of the invention is to provide an ultraviolet lamp which is capable of being used in a parallel flow contact chamber having a high ratio of length to width.

A further object of the invention is the provision of a lamp structure which requires electrical connection at only one end and which may be incorporated in various types of tubular gaseous discharge lamps, such as fluorescent lamps, where electrical connection at one end and/or arrangement of the lamps in a linear series is desired.

SUMMARY OF THE INVENTION

In accordance with the present invention there is provided a tubular lamp construction, such as an ultraviolet lamp comprising a hollow cylinder on the ends of which are mounted end caps, each of which supports an electrode which projects into the cylinder for the purpose of emitting ultraviolet radiation when the lamp is electrically energized. The first electrode is connected to a Teflon coated wire which is disposed along the outside surface of the cylinder and extends through the end cap which supports the second electrodes. The second electrode is also connected to a Teflon coated wire which projects from the second end cap.

In a second embodiment of the invention, a pair of ultraviolet lamps are inserted into a hollow quartz, tubular jacket. The two individual lamps are in substantial alignment and thus provide an ultraviolet light source of extended length. The Teflon coated wires which are connected to the first ultraviolet lamp are disposed between the hollow cylinder of the second light source and the quartz jacket and project out of an open end of the jacket along with the Teflon coated wires which are connected to the second ultraviolet lamp.

In alternative embodiments of the invention the length of the jacket is increased and three, four or more ultraviolet lamps are inserted into the jacket, thereby resulting in a very long ultraviolet light source. The lamps within the jacket may be switched on and off individually thereby enabling a user to adjust the level of ultraviolet energy to the level required by various degrees of wastewater contamination, thereby resulting in the efficient use of electrical power.

Both ends of the jacket may be left open facilitating insertion of ultraviolet lamps from both ends of the assembly or alternatively, one end of the jacket may be sealed. The use of the jacket reduces the number of seals which are required in a wastewater purification apparatus. Conventionally, four ultraviolet lamps require a total of eight seals, one at each end. The use of the quartz jacket containing four ultraviolet lamps, according to the present invention, requires at most two seals, one at each end.

In additional embodiments of the invention, the electrodes are each energized by two wires and there are two wires connected to the first electrode and disposed on the outside surface of the cylinder. In this embodiment the second end cap includes four terminal pins, two of which are connected to the wires extending from the first electrode and two of which are connected to the second electrode.

Additional objects and advantages of the invention will become apparent during the course of the following specification, when taken in connection with the accompanying drawings, in which:

DESCRIPTION OF THE PREFERRED EMBODIMENTS

Figure 1:
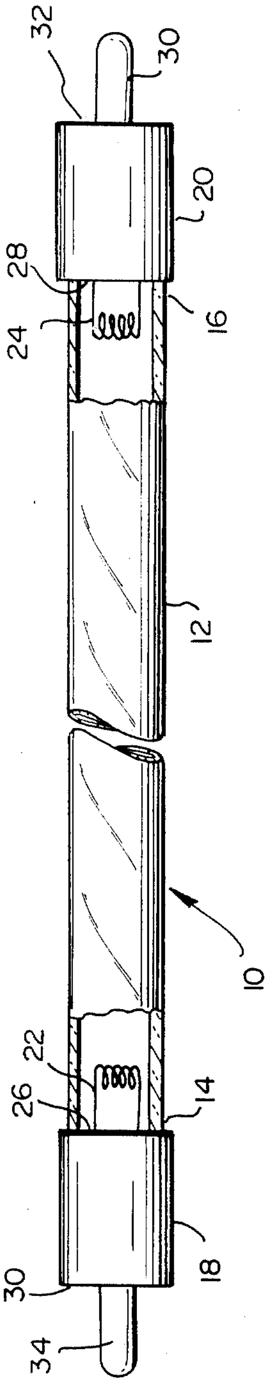
FIG. 1 is a side elevation view of a conventional ultraviolet lamp with portions of the lamp shown broken away to reveal details of internal construction.

With reference to the drawings, there is shown in FIG. 1 a conventional ultraviolet lamp 10 which comprises a transparent cylinder 12 on the ends 14, 16 of which there are base assemblies 18, 20, each of which supports an electrode 22, 24 on its inner end 26, 28. On the outer ends 30, 32 of each of the base assemblies 18, 20 there is a terminal pin 34, 36 which is used to connect the lamp 10 to a source of electrical power.

Figure 2:
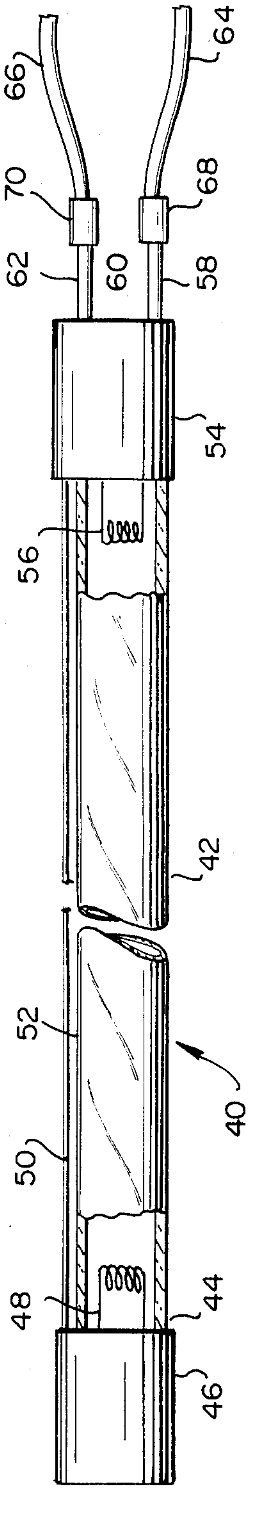
FIG. 2 is a side elevation view of an ultraviolet lamp made in accordance with the present invention with portions of the lamp shown broken away to reveal details of internal construction.

FIG. 2 shows an ultraviolet lamp 40, made in accordance with a preferred embodiment of the present invention, which comprises a transparent hollow cylinder 42 on the first end 44 of which there is an end cap 46 which supports an electrode 48 which projects into the cylinder 42. The electrode 48 is connected electrically to a Teflon coated wire 50 which extends along the outside surface 52 of the cylinder 42 to a second end cap 54 and then passes into the second end cap 54. The second end cap 54 supports a second electrode 56 which also projects into the cylinder 42. The second electrode 56 is connected electrically to a terminal pin 58 which projects from the surface 60 of the end cap 54. The Teflon coated wire 50 is connected to a second terminal pin 62 which also projects from the surface 60 of the end cap 54. The terminal pins 58, 62 are connected to a pair of wires 64, 66 by means of connectors 68, 70. The wires 64, 66 may be connected to a source of electrical power in order to energize the ultraviolet lamp.

Figure 3:
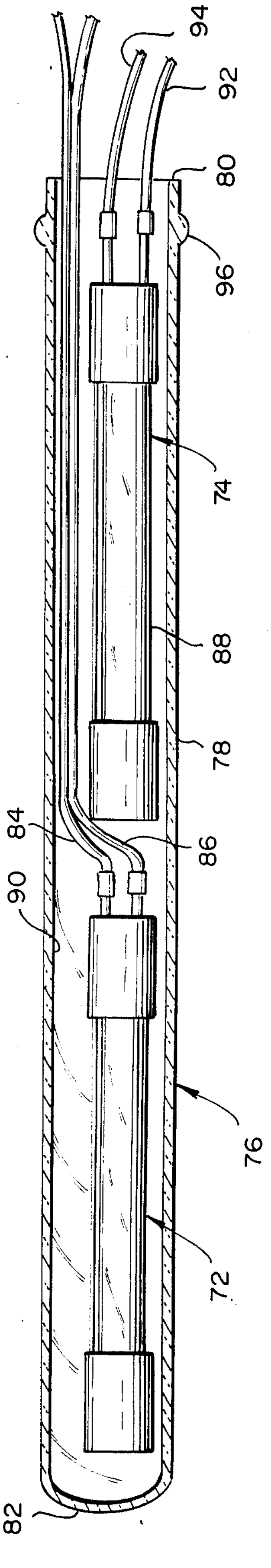
FIG. 3 shows an alternative embodiment of the invention in which a pair of ultraviolet lamps are installed in a single jacket.

FIG. 3 shows an alternative embodiment of the invention in which a pair of ultraviolet lamps 72, 74, each of which are identical to the ultraviolet lamp 40 of FIG. 2, are installed in a quartz jacket 76. The quartz jacket 76 comprises a hollow cylinder 78 having an open end 80 and a sealed end 82. The overall length of the jacket 76 is slightly longer than the combined length of the two ultraviolet lamps 72, 74. The two wires 84, 86 which project from the first ultraviolet lamp 72 are disposed between the cylinder 88 of the second ultraviolet lamp 74 and the inside surface 90 of the quartz jacket 76 and leave the quartz jacket 76 via the open end 80. Similarly, the two wires 92, 94 from the second ultraviolet lamp 74 leave the quartz jacket via the open end 80. The wires 84, 86, 92, 94 may be connected to a source of electrical power, thereby energizing the ultraviolet lamps 72, 74 and providing a source of ultraviolet energy having extended length. The quartz jacket 76 includes a circumferential retaining collar 96 which is disposed proximate to the open end 80. The retaining collar 96 may be used in mounting the quartz jacket 76 in a structure such as a tank for the purpose of exposing wastewater contained in the tank to ultraviolet energy for purposes of disinfection and purification.

In other embodiments, which are not shown, the length of the quartz jacket is extended to accomodate three, or four ultraviolet lamps each identical to the lamp shown in FIG. 2, thereby providing an ultraviolet light source of even greater length.

The embodiment of the invention shown in FIG. 3 and the additional embodiments of the invention which utilize a plurality of aligned individual ultraviolet lamps each according to FIG. 2, overcome the length limitations which are inherent in the construction of an individual ultraviolet lamp and thus provide an ultraviolet light source of extended length. The ultraviolet lamps in each of these embodiments may be connected and disconnected from a source of electrical power individually, thereby enabling a user to adjust the ultraviolet energy produced to the requirements of the wastewater being treated according to the degree of contamination present. This facilitates the efficient use of electrical power and eliminates the need to provide more ultraviolet energy than is needed.

In still another embodiment of the invention, which is not shown but which is similar to the embodiment of FIG. 3, the sealed end 82 of the quartz jacket 76 is open. Having both ends of the quartz jacket 76 open enables a user to load the ultraviolet lamps 72, 74 into the quartz jacket 76 from both ends.

Figure 5:
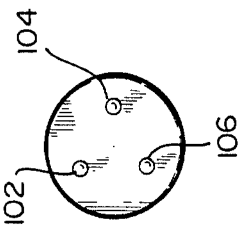
FIG. 5 is an end view of the ultraviolet lamp of FIG. 4.
Figure 4:
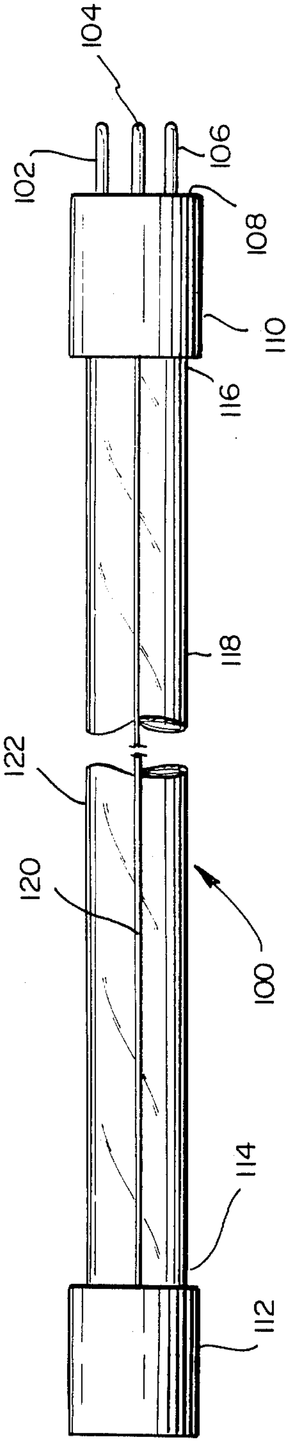
FIG. 4 shows another alternative embodiment of the invention.

FIGS. 4 and 5 show another alternative embodiment 100 of the invention which is generally similar to the ultraviolet lamp 40 of FIG. 2 with the exception that the ultraviolet lamp 100 is connected to a source of electrical power by means of three termainal pins 102, 104, 106 which project from the surface 108 of the end cap 110. The end caps 110, 112 support electrodes which are not shown and which project into the ends 114, 116 of the hollow cylinder 118, in the manner previously described, and the electrode on the first end cap 112 receives electrical power via a Teflon coated wire 120 which extends along the outer surface 122 of the cylinder 116.

Figure 7:
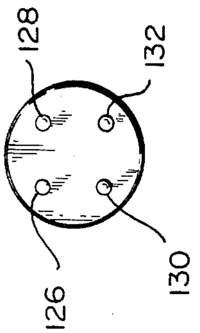
FIG. 7 is an end view of the ultraviolet lamp of FIG. 6.
Figure 6:
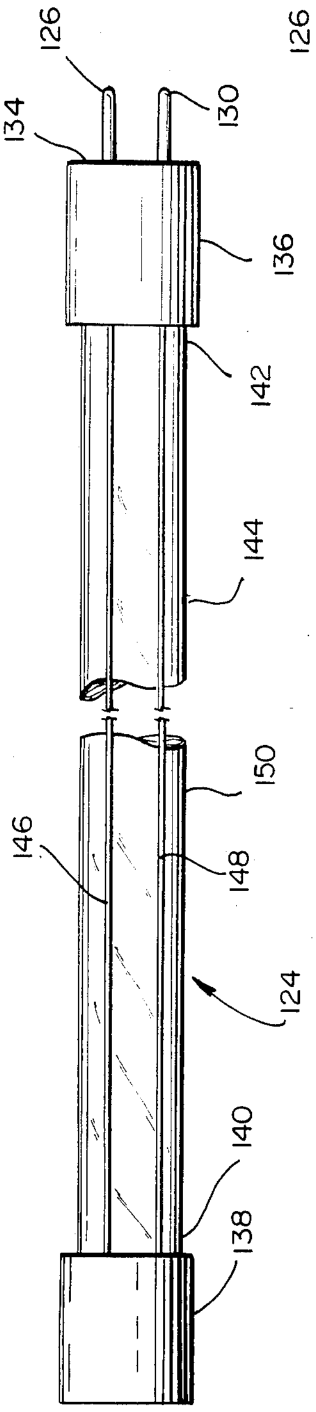
FIG. 6 shows still another alternative embodiment of the invention.
Figure 8:
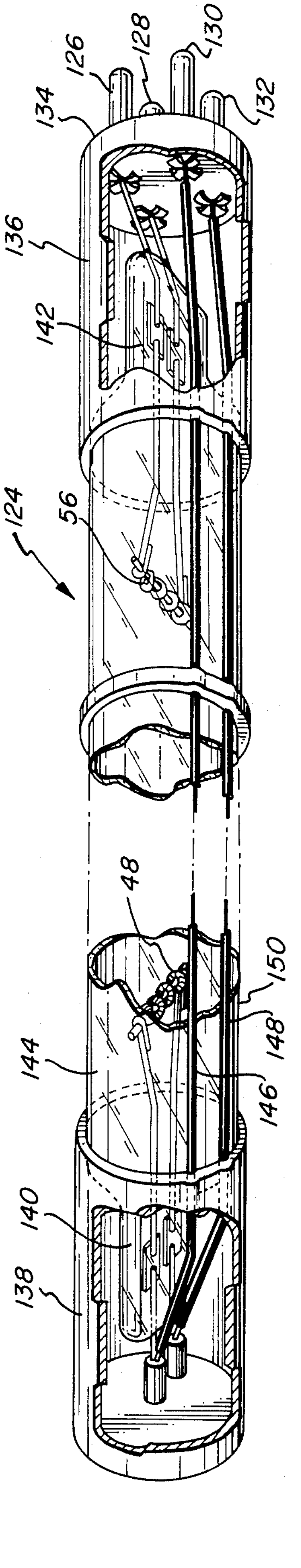
FIG. 8 is a perspective view of the ultraviolet lamp embodying the invention and has parts thereof broken away and/or shown in section.

FIGS. 6 and 7 show still another embodiment 124 of the invention which is similar to the embodiment 100 shown in FIGS. 4 and 5 with the exception that the ultraviolet lamp 124 is connected to a source of electrical power by means of four terminal pins 126, 128, 130, 132 which project from the surface 134 of the end cap 136. The end caps 136, 138 support electrodes 48, 56 which project into the ends 140, 142 of the hollow cylinder 144, in the manner previously described, and the electrode 48 on the first end cap 138 receives electrical power via a pair of Teflon coated wires 146, 148 which extend along the outer surface 150 of the cylinder 144.

While the lamp constructions herein have been described for use as a source of ultraviolet light, it will be understood that the construction described is applicable to other types of tubular gaseous discharge lamps, such as a fluorescent type lamp having the lamp terminals located at the same end. In such fluorescent type lamp, the cylinder, as for example the cylinder 42, is internally coated with a suitable phosphorous coating in a well-known manner. As herein described, the electrode at one end of the fluorescent-type lamp is connected by a suitable electrically insulated wire 50 to a terminal or pin located at the other end, so that the end terminals of the opposed electrodes are located at one common end of the lamp. It will also be understood that the lamps as herein described, whether made for use as a source of ultraviolet light or made for other use, can be varied in diameter and/or length.

While preferred embodiments of the invention have been shown and described herein, it is obvious that numerous additions, changes and omissions may be made in such embodiments without departing from the spirit and scope of the invention.

What is claimed is:

1. A tubular ultraviolet lamp for use in water purification systems comprising an elongated hollow lamp cylinder having a first end and a second end, a first end cap means disposed on said first end of said lamp cylinder, a first electrode means supported by said first end cap means, said first electrode means projecting into said first end of said lamp cylinder and being capable of emitting ultraviolet energy, second end cap means disposed on said second end of said lamp cylinder, a second electrode means supported by said second end cap means, said second electrode means projecting into said second end of said lamp cylinder and being capable of emitting ultraviolet energy, a first terminal means connected to said second electrode and projecting from said second end cap means, a first electric conductor lead means having one end thereof connected directly to said first electrode means within said first end cap means, said first electric conductor lead means projecting from said first end cap means and extending longitudinally of said lamp cylinder externally of said lamp cylinder toward said second end, a second terminal means projecting from said second end cap means, and said first electric conductor lead means having the other end thereof directly connected to said second terminal means within said second end cap means.

2. A tubular ultraviolet lamp for use in water purification systems comprising an elongated hollow lamp cylinder having a first end and a second end, a first end cap means dispsosed on said first end of said lamp cylinder, a first electrode means supported by said first end cap means, said first electrode means projecting into said lamp cylinder and being capable of emitting ultraviolet energy, second end cap means disposed on said second end of said lamp cylinder, a second eldctrode means supported by said second end cap means, said second electrode means projecting into said lamp cylinder and being capable of emitting ultraviolet energy, a terminal pin connected to said second electrode and projecting from said second end cap means, a first electric conductor lead means connected directily to said first electrode means within said first end cap means, said first electric conductor lead means, projecting from said first end cap means and extending longitudinally of said lamp cylinder externally of said lamp cylinder toward said second end, an insulating coating encasing said first electric conductor lead, a second electric conductor lead means connected to said terminal pin of said second electrode means projecting from said second cap means, said first and second electric conductor lead means being adapted for connection to a source of electrical power, and external jacket which is permeable to an ultraviolet wave length encasing said elongated lamp cylinder, said external jacket being opened at least one end thereof, and said first and second electric conductor lead means being extended through said open end of said external jacket.

3. A tubular ultraviolet lamp as defined in claim 2 and including a second terminal pin connected to said second end cap means, and said first electrical conductor lead being connected to said second terminal pin.

4. A tubular ultraviolet lamp assembly for use in water purification systems comprising an elongated jacket formed of a material permeable to ultraviolet energy, said jacket being opened on at least one end thereof, a plurality of ultraviolet lamps disposed in alignment within said jacket, each of said lamps being similarly constructed and including an elongated lamp cylinder, each of said lamp cylinders having a first end and a second end, a first end cap means disposed on said first end of said lamp cylinder, a first electrode means for emitting ultraviolet energy mounted in said first end whereby said first electrode means projects into its respective lamp cylinder, a second end cap disposed on the second end of its respective lamp cylinder, a second electrode means for emitting ultraviolet energy mounted in said second end whereby said second electrode means projects into said respective lamp cylinder, a first terminal means projecting from said second end cap means, said second electrode being connected to said first terminal means within said second end cap means, an electric insulated conductor lead having one end connected directly to its corresponding said first electrode means within said first end cap means, said electric insulated conductor lead extending along the exterior of its respective lamp cylinder and toward the second end of the respective lamp cylinder, a second terminal means projecting from its corresponding second end cap means, said electric insultated conductor lead having its other end connected to said second terminal means within said second end cap means, and an extended conductor electrically connected to each of said first and second terminal means, said extended conductors extending outwardly through the open end of said elongated jacket for connecting the associated lamp to a source of electrical power whereby said lamps can be independently energized.

* * * * *